(12) United States Patent
Otani et al.

(10) Patent No.: US 12,209,747 B2
(45) Date of Patent: Jan. 28, 2025

(54) BOILER

(71) Applicants: MIURA CO., LTD., Matsuyama (JP); Clean Planet Inc., Tokyo (JP)

(72) Inventors: Kazuyuki Otani, Matsuyama (JP); Nobuyuki Ishizaki, Matsuyama (JP)

(73) Assignees: MIURA CO., LTD., Matsuyama (JP); Clean Planet Inc., Tokyo (JP)

( * ) Notice: Subject to any disclaimer, the term of this patent is extended or adjusted under 35 U.S.C. 154(b) by 0 days.

(21) Appl. No.: 17/769,231

(22) PCT Filed: Oct. 25, 2019

(86) PCT No.: PCT/JP2019/041898
§ 371 (c)(1),
(2) Date: Apr. 14, 2022

(87) PCT Pub. No.: WO2021/079489
PCT Pub. Date: Apr. 29, 2021

(65) Prior Publication Data
US 2024/0125466 A1    Apr. 18, 2024

(51) Int. Cl.
*F24V 30/00* (2018.01)
*F22B 1/18* (2006.01)
*H01M 8/04029* (2016.01)

(52) U.S. Cl.
CPC ............ *F22B 1/1869* (2013.01); *F24V 30/00* (2018.05); *H01M 8/04029* (2013.01)

(58) Field of Classification Search
CPC .. F22B 1/1869; F22B 1/02; F22B 1/18; F27B 17/12; C01B 3/0078; F24V 30/00

USPC .......................................................... 122/21
See application file for complete search history.

(56) References Cited

U.S. PATENT DOCUMENTS

| | | | |
|---|---|---|---|
| 8,858,900 B2 * | 10/2014 | Galloway | C10G 2/32 422/628 |
| 9,182,365 B2 | 11/2015 | Kidwell | |
| 11,326,772 B2 * | 5/2022 | Otani | F22B 1/1869 |
| 11,971,199 B2 * | 4/2024 | Iwamura | C01B 3/0042 |
| 2019/0257551 A1 * | 8/2019 | Iwamura | F17C 11/00 |

FOREIGN PATENT DOCUMENTS

| | | |
|---|---|---|
| CN | 203893144 U | 10/2014 |
| EP | 3896364 A1 | 10/2021 |
| JP | 54-077342 A | 6/1979 |
| JP | 63-182596 A | 7/1988 |
| JP | 5-196201 A | 8/1993 |
| JP | 7-243605 A | 9/1995 |
| JP | 10-319169 A | 12/1998 |
| JP | 11-108308 A | 4/1999 |
| JP | 2001-248831 A | 9/2001 |
| JP | 2005-85663 | 3/2005 |
| JP | 2005-85663 A | 3/2005 |
| JP | 2017-203563 A | 11/2017 |
| JP | 2018-132284 A | 8/2018 |

(Continued)

*Primary Examiner* — Gregory A Wilson
(74) *Attorney, Agent, or Firm* — Yoshida & Associates LLC; Ken I Yoshida (57) ABSTRACT

Provided is a boiler including a heat generation body, a container including the heat generation body, and a water pipe to be heated by heat generated by the heat generation body under environment where the inside of the container is filled with gas with higher specific heat than that of air.

5 Claims, 7 Drawing Sheets

(56) References Cited

FOREIGN PATENT DOCUMENTS

| | | | |
|---|---|---|---|
| JP | 6448074 B2 | 12/2018 | |
| KR | 20010070790 A * | 7/2001 | |
| KR | 20030079052 A * | 10/2003 | |
| WO | WO-2015008859 A2 * | 1/2015 | ............... G21B 1/17 |

* cited by examiner

BOILER

TECHNICAL FIELD

The present invention relates to a boiler for heating supplied water.

BACKGROUND ART

Typically, a boiler for heating supplied water has been broadly utilized for various purposes including industrial and commercial purposes. In the boiler, a heat generation unit configured to heat supplied water is provided, and as one form of the heat generation unit, there is one provided with a heat generation body in a container.

There are various specific forms of the above-described heat generation unit, and as one example thereof, one including, in a container, a heat generation body (a reactant) configured such that multiple metal nanoparticles made of hydrogen storing metal or hydrogen storing alloy are formed on a surface has been disclosed as a heat generation system in Patent Literature 1. According to Patent Literature 1, it has been described that in the heat generation system, hydrogen-based gas contributing to heat generation is supplied into the container to store hydrogen atoms in the metal nanoparticles and excess heat is generated.

Note that as also described in Patent Literature 1, an announcement that the heat generation body produced from palladium is provided in the container and heat generation reaction is made by heating the inside of the container while heavy hydrogen gas is being supplied into the container has been released. Moreover, regarding a heat generation phenomenon that the excess heat (an output enthalpy higher than an input enthalpy) is generated utilizing the hydrogen storing metal or the hydrogen storing alloy, details of the mechanism for generating the excess heat have been discussed among researchers of each country, and it has been reported that the heat generation phenomenon has occurred.

PRIOR ART LITERATURE

Patent Literature

Patent Literature 1: Japanese Patent No. 6448074
Patent Literature 2: U.S. Pat. No. 9,182,365

DISCLOSURE OF THE INVENTION

Problems to be Solved by the Invention

It is important for the boiler configured to heat water by the heat generation unit including the heat generation body in the container to transmit heat generated by the heat generation body to water as efficiently as possible. The present invention has been made in view of the above-described object, and is intended to provide a boiler configured to heat water by a heat generation unit including a heat generation body in a container and configured so that heat generated by the heat generation body can be efficiently transmitted to the water.

Solutions to the Problems

The boiler according to the present invention includes a heat generation body, a container including the heat generation body, and a water pipe to be heated by heat generated by the heat generation body under environment where the inside of the container is filled with gas with higher specific heat than that of air.

According to the present configuration, water is heated by a heat generation unit including the heat generation body in the container, and heat generated by the heat generation body can be efficiently transmitted to the water. Note that the "water pipe" described herein means a pipe in which water targeted for heating flows.

More specifically, the above-described configuration may further include, as a path for circulating the gas, a circulation path including, as part thereof, the inside of the container. More specifically, as the above-described configuration, the gas may be hydrogen-based gas. Note that the hydrogen-based gas in the present application is heavy hydrogen gas, light hydrogen gas, or a mixture thereof.

More specifically, as the above-described configuration, the heat generation body may be a reactant configured such that metal nanoparticles made of hydrogen storing metals are provided on a surface and hydrogen atoms are stored in the metal nanoparticles to generate excess heat under a situation where the hydrogen-based gas is supplied into the container. According to the present configuration, water can be heated by excess heat generated by the heat generation body. Note that the "hydrogen storing metals" in the present application means hydrogen storing metal such as Pd, Ni, Pt, and Ti or hydrogen storing alloy containing one or more types of these metals.

More specifically, the above-described configuration may include a heater or a burner configured to heat the reactant. In this configuration, a hydrogen-powered burner configured to burn hydrogen-based gas may be provided as the burner, and a supply source of the hydrogen-based gas into the container may be common to that for the hydrogen-powered burner. According to these configurations, the boiler capable of efficiently utilizing gas can be made using the hydrogen-powered burner which can use the same type of gas as the hydrogen-based gas charged into the container.

More specifically, the above-described configuration may include a fuel cell configured to generate power by reaction between hydrogen-based gas supplied to a fuel electrode and oxygen, and a heater configured to heat the reactant by means of the power generated by the fuel cell. Moreover, in this configuration, a supply source of the hydrogen-based gas into the container is common to that for the fuel electrode, and gas, which is discharged unreacted, of the hydrogen-based gas supplied to the fuel electrode may be supplied into the container. According to these configurations, the boiler capable of efficiently utilizing gas can be made using the fuel cell which can use the same type of gas as the hydrogen-based gas charged into the container.

More specifically, as the above-described configuration, the water pipe may be arranged to spirally extend to surround the heat generation body. According to the present configuration, heat generated by the heat generation body can be efficiently transmitted to water targeted for heating, and the water pipe can be easily arranged to cover the substantially entire area of the periphery of the side wall.

More specifically, as the above-described configuration, the water pipe may include multiple water pipes arranged to extend in the vertical direction to surround the heat generation body. According to the present configuration, heat generated by the heat generation body can be efficiently transmitted to water targeted for heating, and the water pipe can be easily arranged to cover the substantially entire area of the periphery of the side wall while being arranged to form a once-through boiler or one equivalent thereto.

Effects of the Invention

According to the boiler of the present invention, water is heated by the heat generation unit including the heat generation body in the container, and heat generated by the heat generation body can be efficiently transmitted to the water.

BRIEF DESCRIPTION OF THE DRAWINGS

FIG. 5 is a view for describing the course of water passing through a water pipe of the boiler 1a.

DESCRIPTION OF PREFERRED EMBODIMENTS

Hereinafter, a boiler according to each embodiment of the present invention will be described with reference to each drawing.

1. First Embodiment

Figure 1:
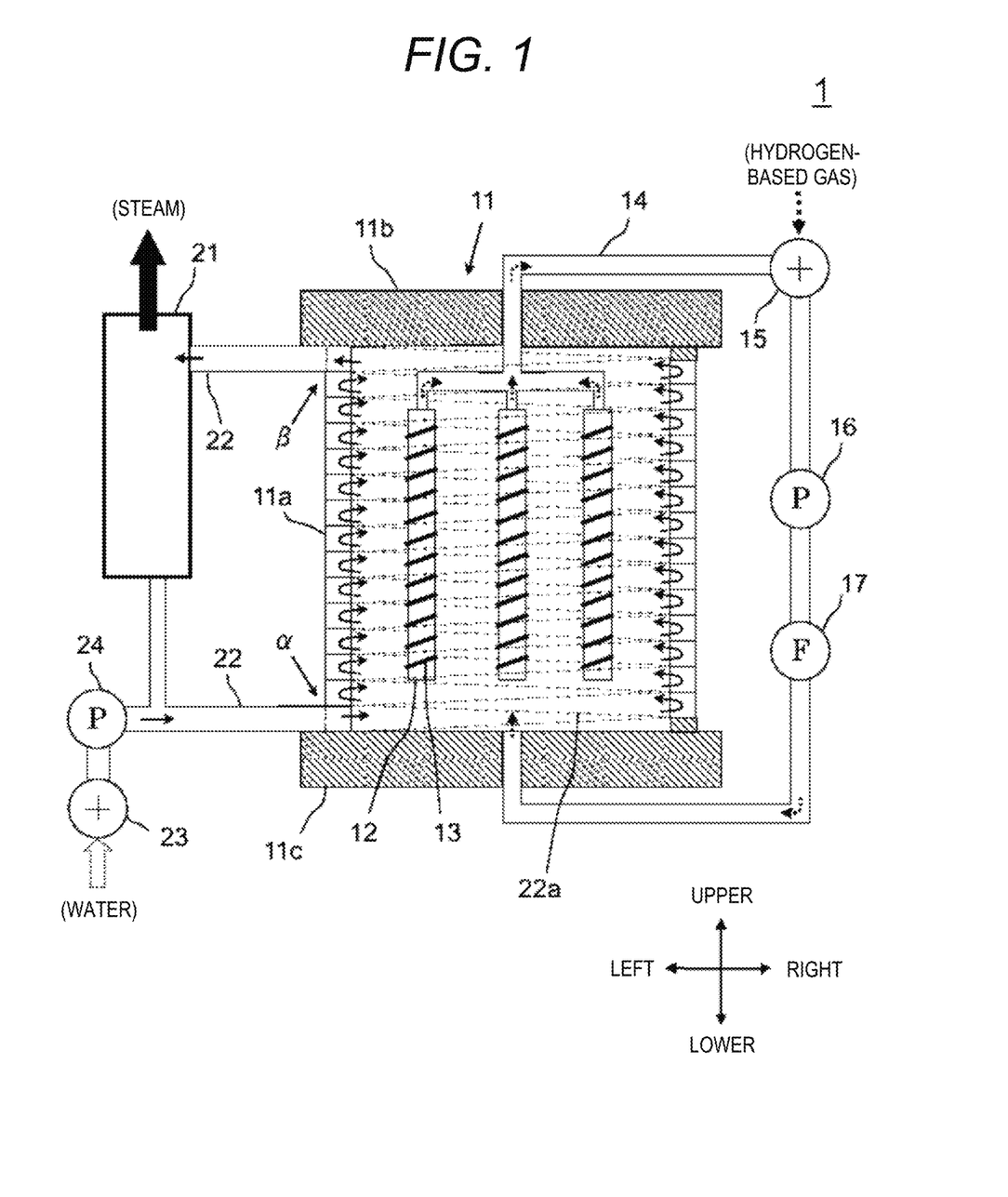
FIG. 1 is a schematic configuration diagram of a boiler 1 according to a first embodiment.

First, a first embodiment of the present invention will be described. FIG. 1 is a schematic configuration diagram of a boiler 1 according to the first embodiment. As illustrated in this figure, the boiler 1 includes a container 11, reactants 12, heaters 13, a gas path 14, a gas receiving portion 15, a gas pump 16, a gas filter 17, a separator 21, a water path 22, a water receiving portion 23, and a water pump 24.

Note that the states of the container 11 and the inside thereof in FIG. 1 (the same also applies to FIGS. 3, 4, 6, and 7 as described later) are illustrated as schematic sectional views along a plane cutting the container 11 substantially in half, and upper, lower, right, and left directions (an upper-lower direction is coincident with the vertical direction) are illustrated as in this figure. Moreover, chain lines illustrated in FIG. 1 (the same also applies to FIGS. 3 and 4) schematically indicate arrangement of a water pipe 22a.

The container 11 is, as a whole, formed in a cylindrical shape having bottoms at both upper and lower ends in the upper-lower direction as an axial direction, and is formed so that gas can be sealed inside. More specifically, the container 11 has a cylindrical side wall 11a formed by the later-described water pipe 22a, and the upper side of the side wall 11a is closed by an upper bottom portion 11b and the lower side of the side wall 11a is closed by a lower bottom portion 11c. Note that in the present embodiment, the side wall 11a of the container 11 is in the cylindrical shape as one example, but may be formed in other tubular shapes. Alternatively, a can body cover may be placed at the outer periphery of the side wall 11a, and a heat insulating member may be provided between the side wall 11a and the can body cover.

The reactant 12 is configured such that many metal nanoparticles are provided on a surface of a carrier formed in a fine mesh shape as a whole. Hydrogen storing alloys (hydrogen storing metal or hydrogen storing alloy) are applied as the material of this carrier, and the carrier is formed in a cylindrical shape having bottoms at both upper and lower ends in the upper-lower direction as the axial direction. An upper surface of the reactant 12 is connected to the gas path 14 so that gas having flowed into the reactant 12 through mesh-shaped clearances thereof can be delivered into the gas path 14. In the example of the present embodiment, three reactants 12 are provided next to each other in a right-left direction in the container 11.

The heater 13 is spirally wound around a side surface of the reactant 12 formed in the bottomed cylindrical shape, and is formed to generate heat by means of external power (e.g., a ceramic heater). The heater 13 generates heat to heat the reactant 12 so that the temperature of the reactant 12 can be increased to a predetermined reaction temperature at which reaction for generating later-described excess heat is easily made. The temperature of the heater 13 can be adjusted to a desired temperature by power control.

The gas path 14 is provided outside the container 11, and forms a gas circulation path including, as part thereof, the inside of the container 11. One end portion of the gas path 14 is connected to the upper surface of each reactant 12, and the other end portion is connected to the inside of the container 11. More specifically, portions of the gas path 14 connected to the upper surfaces of the reactants 12 are joined together in the container 11, and after having penetrated the upper bottom portion 11b as a single path, further penetrate the lower bottom portion 11c through the gas receiving portion 15, the gas pump 16, and the gas filter 17 and are connected to the inside of the container 11.

The gas receiving portion 15 receives a supply of hydrogen-based gas (heavy hydrogen gas, light hydrogen gas, or a mixture thereof) from an external supply source, and causes the supplied hydrogen-based gas to flow into the gas path 15. For example, in a case where the hydrogen-based gas is supplied from a tank storing the hydrogen-based gas in advance to the gas receiving portion 15, such a tank is the hydrogen-based gas supply source. Note that the amount of hydrogen-based gas to be supplied to the gas receiving portion 15 is controlled so that the internal pressure of the container 11 can be controlled.

The gas pump 16 pushes gas in the gas path 14 from an upstream side to a downstream side (i.e., to a direction indicated by dashed arrows in FIG. 1) such that the gas flows in this direction. Note that the force of pushing gas by the gas pump 16 is controlled so that the amount of gas circulating in the circulation path including the gas path 14 can be controlled. The gas filter 17 removes an impurity (specifically, one as a cause for inhibition of the reaction for generating the excess heat in the reactant 12) contained in gas in the gas path 14.

The separator 21 receives steam generated by heating of water through the water pipe 22a, and performs steam separation (separation of drain contained in such steam) for the steam. The steam separated in the separator 21 can be supplied to the outside of the boiler 1.

The water path 22 is a water path connected from the water receiving portion 23 to the separator 21. Part of the water path 22 is the water pipe 22a forming the side wall 11a as described above. Moreover, in the middle of the water path 22, the water pump 24 is arranged at a position immediately on the downstream side of the water receiving portion 23. Note that liquid water supplied from the water receiving portion 23 flows in the upstream-side path of the water path 22 with respect to the water pipe 22a, and water (steam) evaporated by heating in the water pipe 22a flows in the downstream-side path (between the container 11 and the separator 21) with respect to the water pipe 22a.

The water receiving portion 23 receives, as necessary, a supply of water as a steam source from the outside, and causes the supplied water to flow into the water path 22. The water pump 24 causes water in the water path 22 to flow from the upstream side to the downstream side (i.e., to a direction indicated by solid arrows in FIG. 1).

The water pipe 22a spirally extends from the lower bottom portion 11c to the upper bottom portion 11b to form the tubular side wall 11a of the container 11. That is, the water pipe 22a spirally extends in the axial direction (the upper-lower direction) of the tubular side wall 11a such that no clearance is formed between adjacent portions of the water pipe 22a in the upper-lower direction. Note that in the example of the present embodiment, the sectional shape of an inner wall of the water pipe 22a is in a rectangular shape, but may be a circular shape or other shapes.

Next, operation of the boiler 1 will be described. In the boiler 1, the hydrogen-based gas is supplied from the external supply source to the gas receiving portion 15, and the gas circulation path including the inside of the container 11 and the gas path 14 is filled with the hydrogen-based gas. Due to action of the gas pump 16, the charged hydrogen-based gas circulates to the direction indicated by the dashed arrows in FIG. 1 in the gas circulation path.

At this point, in the container 11, the hydrogen-based gas is delivered into the gas path 14 connected to upper portions of the reactants 12 after having flowed in the reactants 12 through the mesh-shaped clearances thereof. At the same time, the reactants 12 are heated by action of the heaters 13. When the reactants 12 are, as described above, heated by the heaters 13 in a state in which the hydrogen-based gas has been supplied into the container 11, hydrogen atoms are stored in the metal nanoparticles provided on the reactants 12, and the reactants 12 generate an excess heat of equal to or higher than the temperature of heating by the heater 13. As described above, since the reactant 12 makes the reaction for generating the excess heat, the reactant 12 functions as a heat generation body. The principle of the reaction for generating the excess heat is, for example, similar to the principle of reaction for generating excess heat as disclosed in Patent Literature 1.

Note that from the hydrogen-based gas in the gas circulation path including the inside of the container 11, the impurity is removed when the hydrogen-based gas passes through the gas filter 17. Thus, the high-purity hydrogen-based gas from which the impurity has been removed is continuously supplied into the container 11. With this configuration, the high-purity hydrogen-based gas can be stably provided to the reactants 12, a state in which the output of the excess heat is easily induced can be maintained, and the reactants 12 can effectively generate heat.

In parallel with the operation of generating heat from the reactants 12 as described above, water is supplied from the outside to the water receiving portion 23. The supplied water flows, due to action of the water pump 24, to the direction indicated by the solid arrows in FIG. 1 in the water path 22.

When passing through the water pipe 22a forming the side wall 11a of the container 11, the water flowing in the water path 22 is heated by heat generated by the reactants 12. That is, the heat generated by the reactants 12 is transmitted to the water pipe 22a by convection (heat transfer) by the hydrogen-based gas in the container 11, and the water pipe 22a of which the temperature has been increased by such transmission heats the water flowing in the water pipe 22a.

Figure 2:
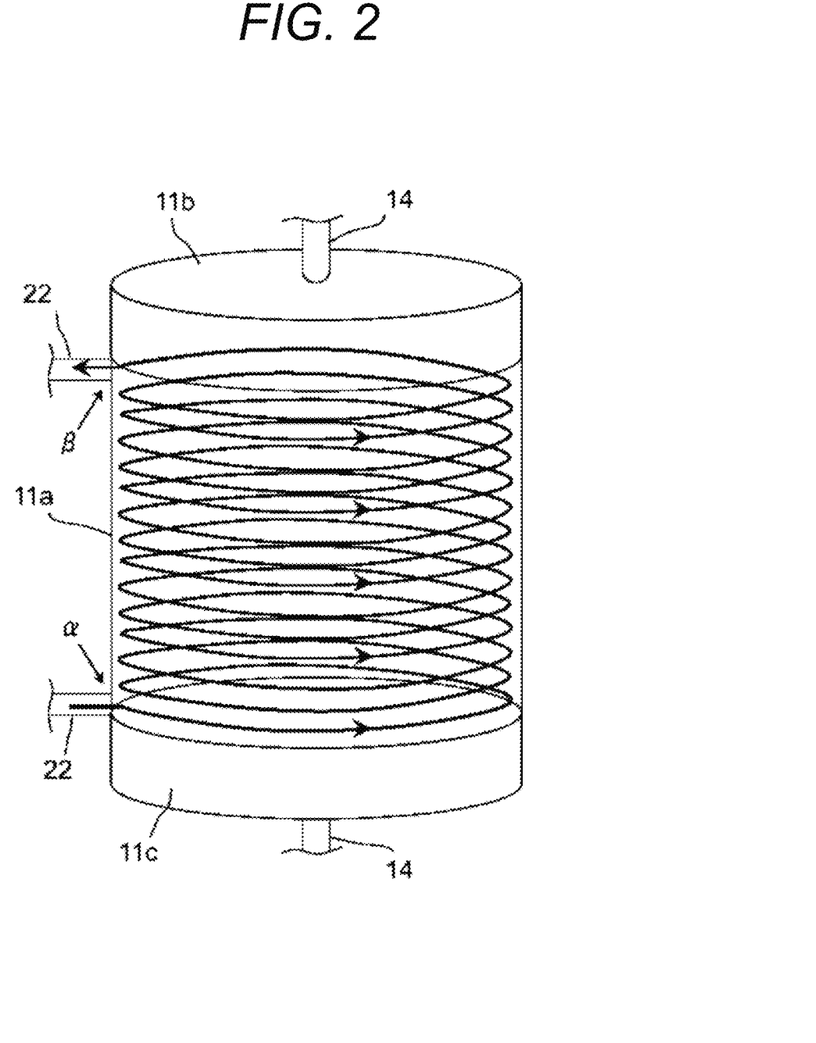
FIG. 2 is a view for describing the course of water passing through a water pipe of the boiler 1.

FIG. 2 schematically illustrates the course of water passing through the water pipe 22a by a solid arrow. As illustrated in this figure, water having entered the water pipe 22a through an inlet α (the lowermost portion of the water pipe 22a) of the water pipe 22a flows along a spirally-extending path in the water pipe 22a, and is discharged as steam toward the separator 21 through an outlet β (the uppermost portion of the water pipe 22a) of the water pipe 22a. At this point, heat from the water pipe 22a (the side wall 11a of the container) heated by heat generated by the reactants 12 is transmitted to the water passing through the water pipe 22a, and the temperature of the water increases.

In this manner, the water flowing in the water path 22 is heated when passing through the water pipe 22a, and the temperature thereof increases. Eventually, the water turns into steam. Such steam is delivered to the separator 21, and after the dryness of the steam has been increased by steam separation, is supplied to the outside of the boiler 1.

The amount of steam supplied from the separator 21 to the outside can be, for example, adjusted according to the amount of steam required from the outside. Moreover, in the boiler 1, water is sequentially supplied to the water receiving portion 23 by an amount corresponding to a steam supply to the outside, i.e., a water decrement, and steam can be continuously generated and supplied to the outside.

Note that in the boiler 1, the temperature of the reactant 12 or the periphery thereof may be monitored and at least one of the temperature of the heater 13, the internal pressure of the container 11, or the amount of hydrogen-based gas circulating in the circulation path may be controlled according to the detected temperature. Normally, tendency shows that the reaction for generating the excess heat at the reactant 12 is more promoted and water is more easily heated by heat generated from the reactant 12 as the temperature of the heater 13 increases. The same also applies to the case of increasing the internal pressure of the container 11 and the case of increasing the circulation amount of the hydrogen-based gas. Thus, it may only be required that, e.g., the temperature of the heater 13 is controlled such that water is moderately heated.

In the boiler 1 of the present embodiment, the reactant 12 is employed as the heat generation body. Instead, a heat generation element 12a (e.g., a halogen heater configured to generate heat by a supply of external power) such as a general heater can be employed to form a boiler. A schematic configuration diagram of a boiler 2 configured as described above is illustrated as an example in FIG. 3. Note that for the sake of convenience, the shape and dimensions of the heat generation element 12a are similar to those of the reactant 12. Moreover, since one equivalent to the heater 13 is not necessary for the heat generation element 12a, placement thereof is omitted.

Figure 3:
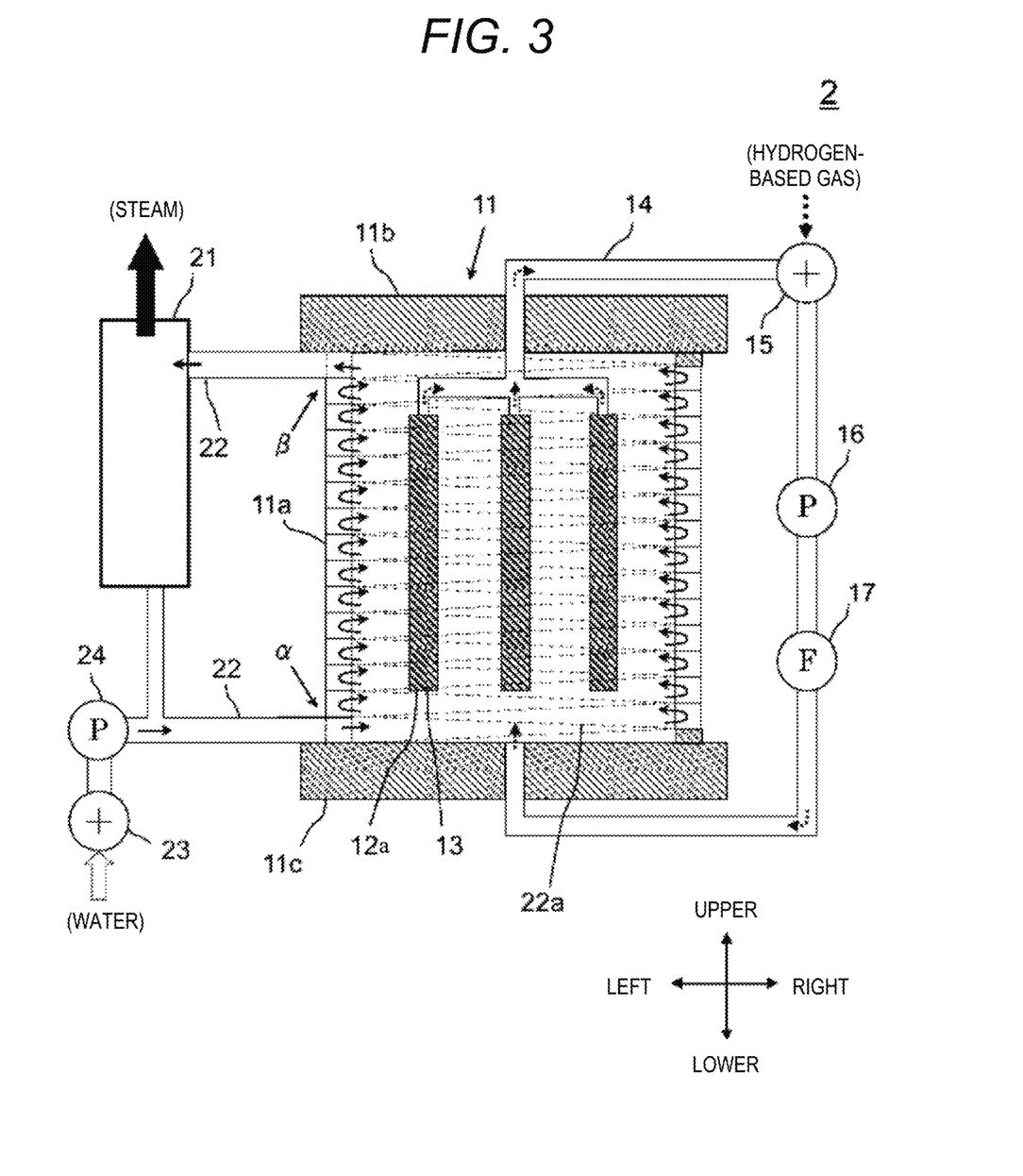
FIG. 3 is a schematic configuration diagram of a boiler 2 in the case of employing heat generation elements.

In the form of the boiler 2 illustrated in FIG. 3, a water pipe 22a is heated by heat generated from the heat generation elements 12a instead of the reactants 12, and the heat from the water pipe 22a (a side wall 11a of a container) is transmitted to water passing through the water pipe 22a, and the temperature of the water increases. Moreover, in this form, the above-described reaction for generating the excess heat is not necessary, and the temperature of the heat generation element 12a is directly controlled by, e.g., power control so that water can be moderately heated to generate steam.

As described above, each boiler 1, 2 includes the heat generation bodies and the container 11 having the heat generation bodies inside, and is configured to heat supplied water to generate steam. Further, each boiler 1, 2 includes the water pipe 22a to be heated by heat generated by the heat generation bodies under environment where the inside of the container 11 is filled with gas (the hydrogen-based gas in the examples of the present embodiment) with higher specific heat than that of air, and water (water as the steam source) passing through the water pipe 22a is heated. Note that under, e.g., a condition of 1 atm at 200° C., the specific heat of air is about 1,026 J/Kg° C., and on the other hand, the specific heat of hydrogen is about 14,528 J/Kg° C. and is extremely higher than the specific heat of air. Moreover, as the heat generation body, the reactant 12 is employed in the boiler 1, and the heat generation element 12a is employed in the boiler 2.

According to each boiler 1, 2, heat generated by the heat generation bodies can be efficiently transmitted to water while such water is heated by a heat generation unit including the heat generation bodies in the container 11 to generate steam. That is, for example, in a case a heat medium such as fluid other than water flows in a water pipe to exchange heat with water outside the container 11, a heat loss due to the presence of the heat medium or delivery thereof might be caused. On this point, in each boiler 1, 2, the water pipe itself is arrange to surround the heat generation bodies, and therefore, the heat medium for collecting heat generated by the heat generation bodies is not necessary. As a result, the above-described heat loss can be reduced, and heat generated by the heat generation bodies can be efficiently transmitted to water as the steam source.

Further, the inside of the container 11 is filled with gas with higher specific heat than that of air, and therefore, heat transfer can be favorably performed as compared to the case of charging general air, and heat generated by the heat generation bodies can be efficiently transmitted to water as the steam source. Moreover, due to high specific heat, it is less likely to fluctuate the temperature of gas, and heat can be more stably transmitted to water.

Moreover, the water pipe 22a forms the entire periphery of the side wall 11a formed in the tubular shape, and therefore, heat generated by the heat generation bodies can be efficiently transmitted to water as the steam source. Specifically, the water pipe 22a in the present embodiments is arranged to spirally extend to surround the heat generation bodies, and therefore, the substantially entire area of the periphery of the side wall 11a can be covered and heat generated by the heat generation bodies can be transmitted to water as the steam source with as least waste as possible.

Note that in the present embodiment, the side wall 11a for sealing gas in the container 11 is formed by the water pipe 22a. Instead, the side wall 11a may be provided separately from the water pipe 22a, and the water pipe 22a may be provided inside the side wall 11a (i.e., in the container 11). In this case, under environment where the inside of the container 11 is filled with gas with higher specific heat than that of air, the water pipe 22a can be also heated by heat generated by the heat generation bodies. Moreover, in this case, the water pipe 22a does not necessarily fulfill a function as the side wall 11a, but preferably fulfills such a function because the water pipe 22a more easily receives heat from the reactants 12 when there is a clearance between adjacent portions of the water pipe 22a in the upper-lower direction.

In each boiler 1, 2, the above-described gas circulates in the circulation path including, as part thereof, the inside of the container 11. With this configuration, the effect of accelerating gas motion in the container 11 and more effectively performing heat transfer from the gas to the side wall 11a is expected. Note that in the boiler 2 not requiring the reaction for generating the excess heat, a mechanism configured to circulate gas in the container 11 may be omitted, and instead, a mechanism configured to supply gas into the container 11 to fill the container 11 with the gas may be provided. Moreover, the reaction for generating the excess heat is not necessary in the boiler 2, and therefore, gas other than the hydrogen-based gas may be employed as the above-described gas with higher specific heat than that of air.

2. Second Embodiment

Next, a second embodiment of the present invention will be described. Note that the second embodiment is basically similar to the first embodiment, except for the form of a water pipe. In description below, description of contents different from those of the first embodiment will be focused, and description of contents common to the first embodiment might be omitted.

Figure 4:
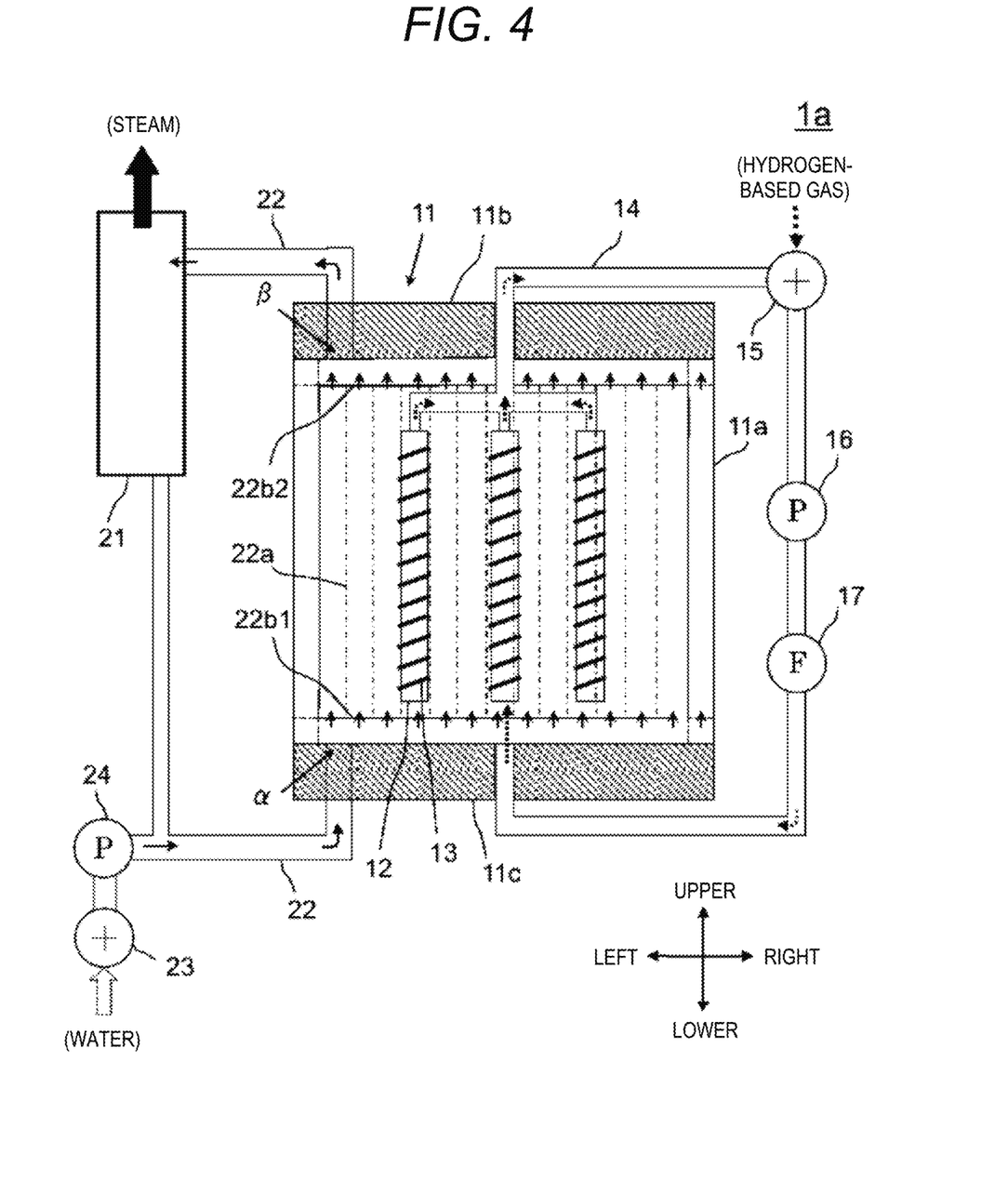
FIG. 4 is a schematic configuration diagram of a boiler 1a according to a second embodiment.

FIG. 4 is a schematic configuration diagram of a boiler 1a according to the second embodiment. As illustrated in this figure, a water path 22 in the second embodiment includes a lower header 22b1 and an upper header 22b2 in addition to multiple water pipes 22a extending up and down in the vertical direction.

The lower header 22b1 extends to form a circular shape on a lower side of a side wall 11a in a cylindrical shape, and at a lower left portion thereof, an inlet α of the lower header 22b1 is formed. The upper header 22b2 extends to form a circular shape on an upper side of the side wall 11a in the cylindrical shape, and at an upper left portion thereof, an outlet β of the upper header 22b2 is formed. The lower header 22b1 and the upper header 22b2 are set to the substantially same shape and dimensions, and are arranged to overlap with each other as viewed from above. A portion of the water path 22 extending from a water pump 24 is connected to the inlet α of the lower header 22b1, and a portion of the water path 22 extending from the outlet β of the upper header 22b2 is connected to a separator 21.

The multiple water pipes 22a extend in an upper-lower direction between the lower header 22b1 and the upper header 22b2, and are arranged next to each other in a circumferential direction of the cylindrical shape of the side wall 11a to form the side wall 11a in the cylindrical shape. Each of the multiple water pipes 22a is integrated such that there is no clearance between adjacent ones of the water pipes 22a in the circumferential direction.

An internal space of each of the multiple water pipes 22a is connected to an internal space of the lower header 22b1 on the lower side, and is connected to an internal space of the upper header 22b2 on the upper side. That is, the circular lower header 22b1 is connected to lower ends of all of the multiple water pipes 22a, and the circular upper header 22b2 is connected to upper ends of all of the multiple water pipes 22a. With this configuration, water having entered the lower header 22b1 through the inlet α can reach the outlet β through the water pipes 22a.

Figure 5:
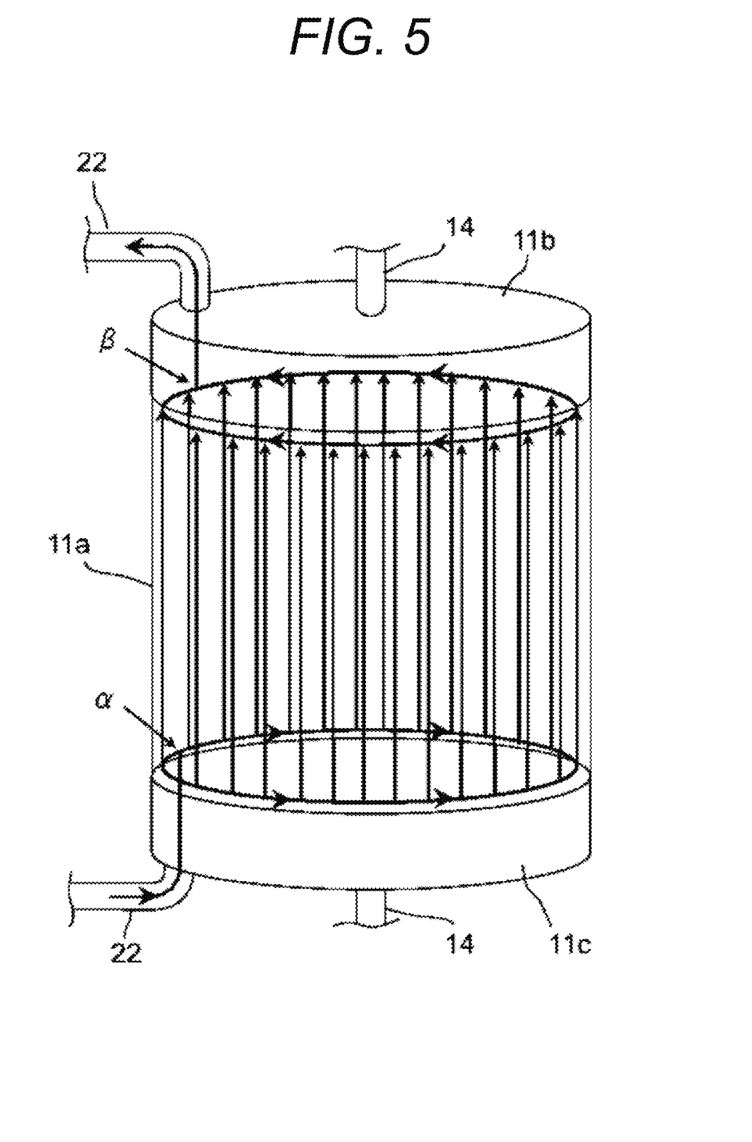

FIG. 5 schematically illustrates the course of water passing through the water pipes 22a and the periphery thereof by a solid arrow. When water enters the lower header 22b1 through the inlet α, the water flows in the circumferential direction along the lower header 22b1, and further flows upward along each of the multiple water pipes 22a. Moreover, the water heated in the water pipes 22a reaches, as steam, the upper header 22b2, flows in the circumferential direction along the upper header 22b2, and is delivered to the separator 21 through the outlet R.

As described above, in the present embodiment, the water path 22 has the multiple water pipes 22a extending in an axial direction (the vertical direction) of the tubular side wall 11a. These water pipes 22a are arranged in the circumferential direction of the tubular shape to form the side wall 11a, and therefore, are arranged to surround heat generation bodies. Thus, in the present embodiment, the water pipes 22a are easily arranged to cover the substantially entire area of the periphery of the side wall 11a while the water pipes 22a are arranged to form a once-through boiler or one equivalent thereto. Heat generated by the heat generation bodies can be transmitted to water as a steam source with as least waste as possible.

3. Third Embodiment

Next, a third embodiment of the present invention will be described. Note that the third embodiment is basically similar to the first embodiment, except that a hydrogen-powered burner is employed as a reactant heating unit instead of a heater. In description below, description of contents different from those of the first embodiment will be focused, and description of contents common to the first embodiment might be omitted.

Figure 6:
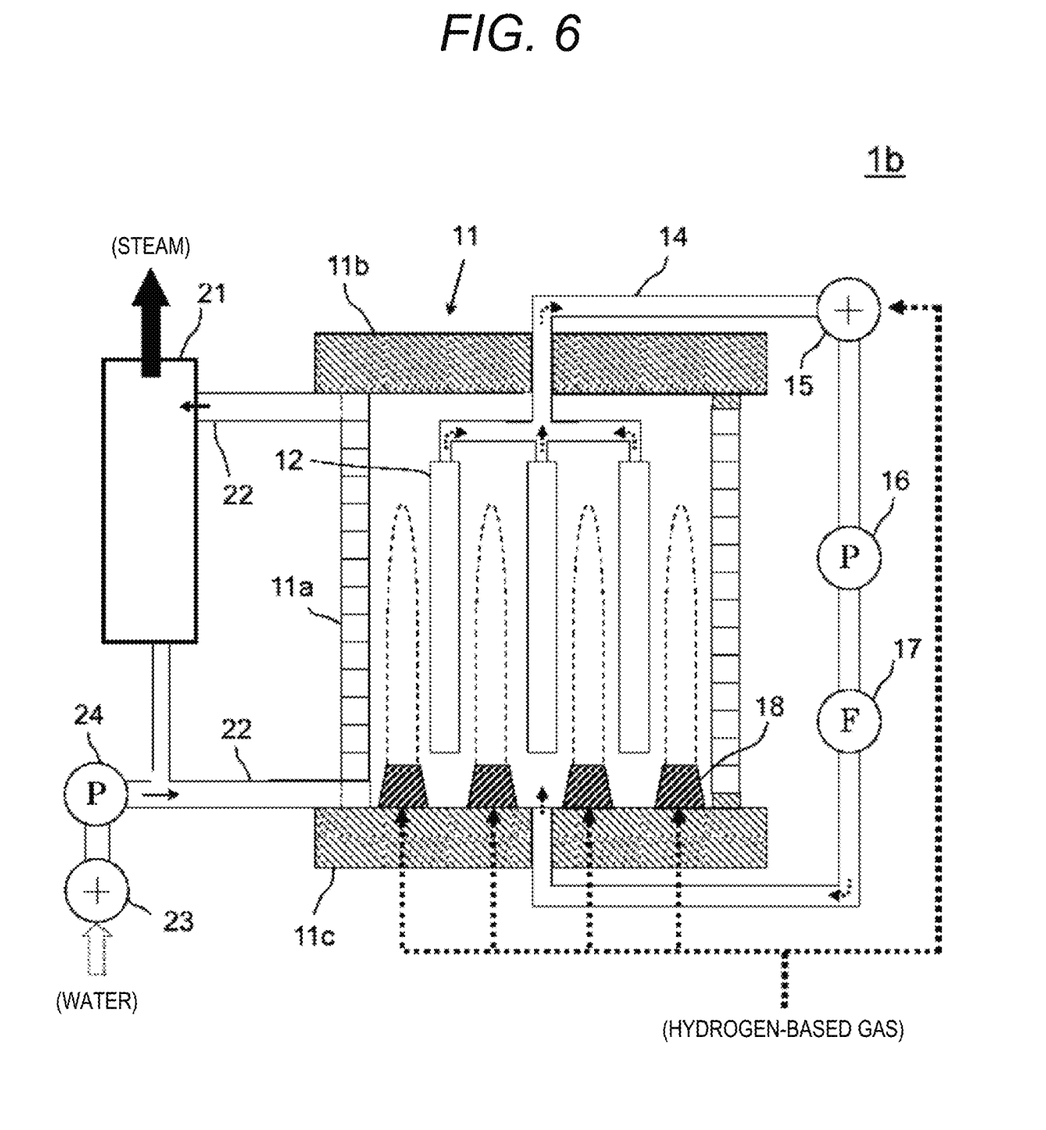
FIG. 6 is a schematic configuration diagram of a boiler 1b according to a third embodiment.

FIG. 6 is a schematic configuration diagram of a boiler 1b according to the third embodiment. Note that considering visibility in FIG. 6, the solid arrows and the chain lines illustrated in FIG. 1 are omitted. As illustrated in this figure, in the boiler 1b, a hydrogen-powered burner 18 is provided instead of omitting placement of the heaters 13 (see FIG. 1).

The hydrogen-powered burner 18 is a burner using hydrogen-based gas as fuel, and in a container 11, is arranged so that not only reactants 12 but also a side wall 11a can be heated. In the example of the present embodiment, the hydrogen-powered burner 18 is arranged to spurt combustion flame to among the reactants 12 and the side wall 11a to efficiently heat these components. Note that the hydrogen-powered burner 18 may be arranged outside the container 11, and may directly heat the side wall 11a and heat the reactants 12 through the side wall 11a.

In the present embodiment, the hydrogen-powered burner 18 fulfills a role in heating the reactants 12, and therefore, placement of the above-described heaters 13 can be omitted and other external heat sources for increasing the temperature of the reactant 12 are not necessary either. Moreover, a supply source of the hydrogen-based gas supplied as the fuel of the hydrogen-powered burner 18 is common to that of hydrogen-based gas supplied to a gas receiving portion 15. With this configuration, the hydrogen-based gas supplied from such a supply source can be efficiently utilized, and it is also advantageous in, e.g., simplification of the configuration of the boiler.

Further, the hydrogen-powered burner 18 heats the side wall 11a so that water passing through water pipes 22a can be heated. As described above, in the present embodiment, water can be heated not only by heat generated from the reactants 12, but also by the hydrogen-powered burner 18. Thus, e.g., upon the start-up of the boiler 1b, water is heated using the hydrogen-powered burner 18 until sufficient heat is generated from the reactants 12, and therefore, steam can be more promptly generated. Specifically, the reactant 12 has such properties that reaction starts after the temperature of the reactant 12 has increased to a predetermined reaction temperature and the reactant 12 gradually generates excess heat, and therefore, water is heated using the hydrogen-powered burner 18 upon the start-up so that time necessary until generation of steam can be significantly shortened.

4. Fourth Embodiment

Next, a fourth embodiment of the present invention will be described. Note that the fourth embodiment is basically similar to the first embodiment, except that a fuel cell is provided. In description below, description of contents different from those of the first embodiment will be focused, and description of contents common to the first embodiment might be omitted.

Figure 7:
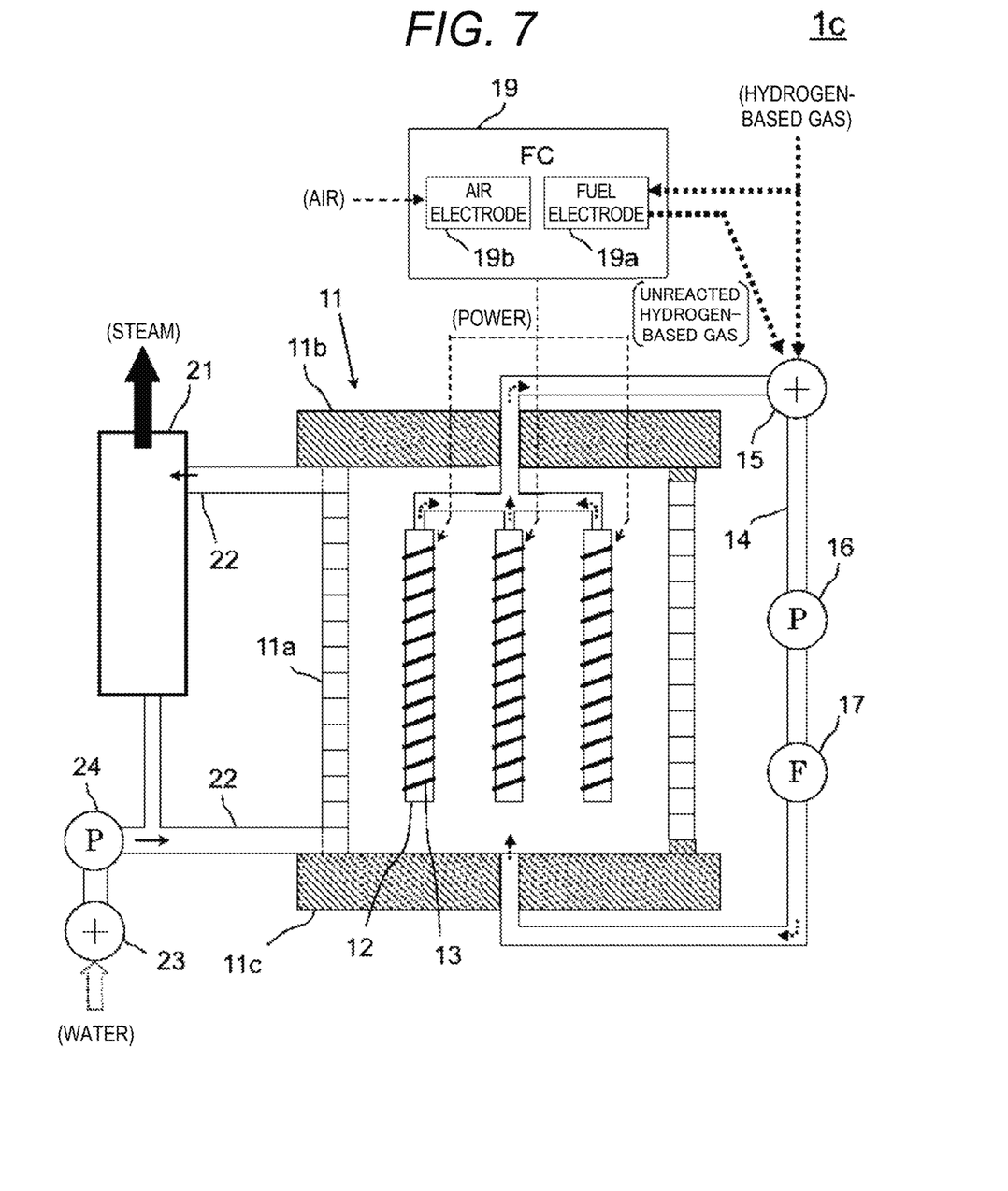
FIG. 7 is a schematic configuration diagram of a boiler 1c according to a fourth embodiment.

FIG. 7 is a schematic configuration diagram of a boiler 1c according to the fourth embodiment. Note that considering visibility in FIG. 7, the solid arrows and the chain lines illustrated in FIG. 1 are omitted. As illustrated in this figure, in the boiler 1c, a fuel cell 19 is provided.

The fuel cell 19 is, for example, a solid oxide fuel cell (SOFC), and generates power by reaction between hydrogen-based gas supplied to a fuel electrode 19a and oxygen in air supplied to an air electrode 19b to supply, as drive power, the generated power to heaters 13. Accordingly, the heaters 13 can generate heat by the power supplied from the fuel cell 19, thereby heating heat generation bodies 12. Thus, in the present embodiment, external power for driving the heaters 13 is not necessary. Note that the power generated by the fuel cell 19 may be also supplied to a load other than the heaters 13. General configuration, operating principle and the like of the fuel cell are well-known, and therefore, detailed description thereof will be omitted herein.

A supply source of the hydrogen-based gas supplied to the fuel electrode 19a is common to that of hydrogen-based gas supplied to a gas receiving portion 15. With this configuration, the hydrogen-based gas supplied from such a supply source can be efficiently utilized, and it is also advantageous in, e.g., simplification of the configuration of the boiler.

Of the hydrogen-based gas supplied to the fuel electrode 19a, hydrogen-based gas discharged unreacted from the fuel electrode 19a is, in the present embodiment, supplied to the gas receiving portion 15, and is supplied into the container 11 by way of a gas path 14. More specifically, e.g., steam separation processing by a condenser (not shown) and foreign body removal processing by a membrane separator (not shown) are performed for exhaust gas (including the unreacted hydrogen-based gas) discharged from the fuel electrode 19a, and the hydrogen-based gas of which the purity has been increased through such processing is supplied to the gas receiving portion 15. Thus, the hydrogen-based gas discharged from the fuel electrode 19a can be effectively utilized.

Note that in the present embodiment, the hydrogen-based gas is supplied from the same supply source to the fuel electrode 19a and the gas receiving portion 15 in parallel, but the hydrogen-based gas may be supplied only to the fuel electrode 19a from the supply source and only the hydrogen-based gas discharged unreacted from the fuel electrode 19a may be supplied to the gas receiving portion 15. Conversely, the hydrogen-based gas may be supplied only to the gas receiving portion 15 from the supply source, and only the hydrogen-based gas circulating in the gas path 14 may be supplied to the fuel electrode 19a. Further, in this case, the hydrogen-based gas discharged unreacted from the fuel electrode 19a may be returned to the gas path 14 again.

The embodiments of the present invention have been described above, but the configurations of the present invention are not limited to those of the above-described embodiments. Various changes can be made without departing from the gist of the invention. That is, the above-described embodiments are examples on all points, and should be considered as not being limited. For example, the boiler according to the present invention is also applicable to a hot water boiler, a heat medium boiler, and the like in addition to the boiler generating steam as in the above-described embodiments. The technical scope of the present invention is not determined by description of the above-described embodiments, but is determined by the claims. It should be understood that meaning equivalent to that of the claims and all changes pertaining to the claims are included.

INDUSTRIAL APPLICABILITY

The present invention relates to a boiler.

LIST OF REFERENCE NUMERALS 1, 1a, 1b, 1c, 2 Boiler
11 Container
11a Side Wall
11b Upper Bottom Portion
11c Lower Bottom Portion
12 Reactant
12a Heat Generation Element
13 Heater
14 Gas Path
15 Gas Receiving Portion
16 Gas Pump
17 Gas Filter
18 Hydrogen-Powered Burner
19 Fuel Cell
19a Fuel Electrode
19b Air Electrode
21 Tank
22 Water Path
22a Water Pipe
22b1 Lower Header
22b2 Upper Header
23 Water Receiving Portion
24 Water Pump

The invention claimed is:

1. A boiler comprising:
a water pipe;
a heat generation body;
a container including the heat generation body and the water pipe both being located inside the container;
a fuel cell located outside the container and configured to generate power by reaction between hydrogen-based gas supplied to a fuel electrode and oxygen; and
a heater located inside the container and configured to heat a reactant by means of the power generated by the fuel cell, wherein the water pipe is heated via convection, radiation and transmission by heat generated by the heat generation body under environment where the inside of the container is filled with hydrogen-based gas with higher specific heat than that of air.

2. The boiler according to claim 1, further comprising:
a supply source for supplying the hydrogen-based gas both into the container and the fuel electrode from a common one of the supply source.

3. The boiler according to claim 1, wherein
of the hydrogen-based gas supplied to the fuel electrode, gas discharged unreacted is supplied into the container.

4. The boiler according to claim 1, wherein
the water pipe is arranged to spirally extend to surround the heat generation body.

5. The boiler according to claim 1, wherein
the water pipe includes multiple water pipes arranged to extend in a vertical direction to surround the heat generation body.

* * * * *